(12) United States Patent
Hsu et al.

(10) Patent No.: US 7,099,249 B2
(45) Date of Patent: Aug. 29, 2006

(54) METHOD FOR SELECTING OPTIMAL RECORDING AND ERASING POWERS FOR AN OPTICAL DISK DRIVE

(75) Inventors: Han-Wen Hsu, Hsin-Chu (TW); Ming-Hsien Tsai, Kao-Hsiung (TW)

(73) Assignee: MediaTek Inc., Hsin-Chu (TW)

( * ) Notice: Subject to any disclaimer, the term of this patent is extended or adjusted under 35 U.S.C. 154(b) by 602 days.

(21) Appl. No.: 10/249,042

(22) Filed: Mar. 12, 2003

(65) Prior Publication Data
US 2004/0179447 A1    Sep. 16, 2004

(51) Int. Cl.
*G11B 7/00* (2006.01)
(52) U.S. Cl. .................... 369/47.53; 369/116
(58) Field of Classification Search ............ 369/47.53, 369/116, 47.5, 47.52, 47.51
See application file for complete search history.

(56) References Cited

U.S. PATENT DOCUMENTS 5,793,737 A * 8/1998 Den Boef ................ 369/47.53

FOREIGN PATENT DOCUMENTS

| EP | 0762399 A1 | 12/1997 |
|----|------------|---------|
| EP | 1111598 A2 | 6/2001 |
| EP | 1111598 A3 | 6/2001 |
| WO | PCT 98/25267 A1 | 6/1998 |

* cited by examiner

*Primary Examiner*—Nabil Hindi
(74) *Attorney, Agent, or Firm*—Winston Hsu (57) ABSTRACT

A method in which, during an optimal power calibration (OPC) process, an optical disk drive performs a plurality of write tests to an optical disk at a plurality of test powers and measures a corresponding plurality of modulation signal strength values of the optical disk for the plurality of write tests to generate a modulation signal strength versus power curve. The method then determines possible gamma lines corresponding to considered powers, and selects a considered power as a target power of the optical disk drive when a possible gamma line is substantially tangential to the modulation signal strength versus power curve at the considered power. According to the method, powers within a domain of the plurality of test powers are considered until a considered power is selected as the target power for the optical disk.

23 Claims, 7 Drawing Sheets

METHOD FOR SELECTING OPTIMAL RECORDING AND ERASING POWERS FOR AN OPTICAL DISK DRIVE

BACKGROUND OF INVENTION

1. Field of the Invention

The present invention relates to a digital electronic device, and more specifically, to an optical storage device capable of writing to an optical disk.

2. Description of the Prior Art

Optical media is a popular data storage means having high storage density, reliable data stability, and good portability. Compact disks (CDs) and digital versatile disks (DVDs) have all but replaced traditional competing storage devices such as magnetic floppy disks and audio and video tapes. While digital devices used to read and write optical media, such as CD-ROM drives and DVD players, are complicated and highly precise, technological innovation has made these devices reliable and practical.

In the past, optical disk drives were mainly available to end users as read only devices. Most users were satisfied with simply receiving software, music, or movies on CDs or DVDs and gave little thought to using the devices as storage for themselves. Optical disk drives capable of writing were specialized and expensive pieces of equipment used mainly by media publishers to produce their products. More recently, writable optical disk drives, such as common CD-RW drives for use with computer systems, have become widely available to individuals. And as a result, the need to improve performance of these devices has increased considerably.

Figure 1:
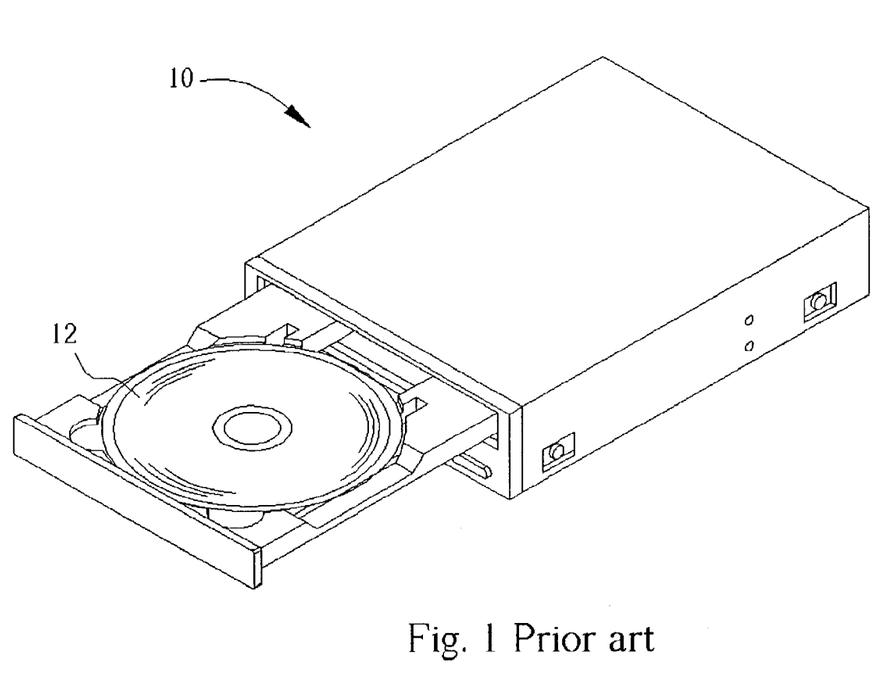
FIG. 1 is a perspective view of an optical disk drive.

FIG. 1 shows a typical CD-RW drive 10 that is commonly used in computer systems. The CD-RW drive 10 is capable of reading, writing, and erasing data on a CD 12. The basic operations of CD-RW drives are well known in the art. Additionally, Van Der Zande et al. teaches operation of a writable optical drive in detail in U.S. Pat. No. 4,901,300, which is incorporated herein by reference.

A fundamental operation of the CD-RW drive 10 is an optimal power calibration (OPC) process in which the optimal recording power for a given CD is determined. The OPC process must be completed before recording to the CD can begin. The optimal recording power is determined by performing a series of recording tests to a power calibration area of the CD. A crucial value in the OPC process is the Orange Book gamma ($\gamma$) value, which relates recorded RF quality to recording power as follows:

$$\gamma = \frac{\left(\frac{dm}{dP_W}\right)}{\left(\frac{m}{P_W}\right)} \qquad \text{[(Eqn. 1)]}$$

where, m represents the modulation amplitude of the RF signal;

$P_W$ is recording power; and $dm/dP_W$ is a differential of modulation amplitude with respect to recoding power;

An optimal or target gamma value is written to a blank CD at the time of manufacture, and is read by the optical drive when recording is to be performed. Conventionally, during the OPC process, several recording powers as tested by writing to the power calibration area of the CD. The modulation amplitude of each test power is measured, the derivative of the modulation amplitude with respect to recording power is numerically determined along with other calculations according to Eqn. 1, and a gamma curve is generated. The target power is then determined from the gamma curve referencing the target gamma value.

Figure 2:
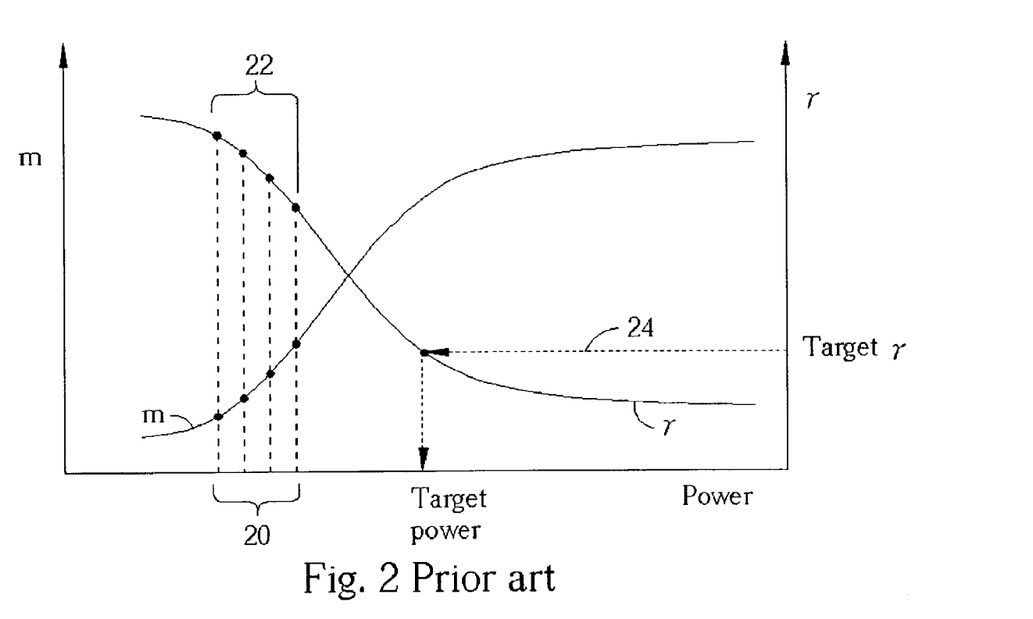
FIG. 2 is a graph relating to a method of performing an OPC process according to the prior art.

The previously described procedure is illustrated in FIG. 2 showing a graph of measured modulation amplitude m and gamma value $\gamma$ versus recording power. When performing the OPC procedure, microprocessors and control circuitry of a conventional optical diskdrive first measure modulation amplitudes for a series of recording powers to generate the modulation amplitude curve as indicated by numeral 20 in FIG. 2 (the 4 points shown being representative). The optical disk drive then calculates a gamma curve from the measured modulation data, as indicated by numeral 22. Then, to obtain the target power the optical disk drive references the target gamma and calculates or looks up the target power. Finally, optimal write and erase powers are determined as follows:

$$P_{WO} = \rho \, P_T \qquad \text{(Eqns. 2)}$$

$$P_{EO} = \varepsilon \, P_{WO}$$

where, $P_{WO}$ is the optimal recording power;

$\rho$ is a recording constant;

$P_T$ is the target power;

$P_{EO}$ is the optimal erasing power; and $\varepsilon$ is an erasing constant;

The constants $\rho$ and $\varepsilon$ for respectively determining the optimal recording and erasing powers are written to the blank disk at the time of manufacture and read by the optical disk drive during the OPC process. During the OPC process, operations of a CD-R drive differ from a CD-RW drive mainly in that erasing power is irrelevant for the CD-R drive.

Conventional optical disk drives determine the optimal recording and erasing powers using circuitry incorporating Eqn. 1 and Eqns. 2. However, this method is highly sensitive to measurement noise. Specifically, as the gamma curve is related to measured modulation amplitudes by a differential function (Eqn. 1) and modulation amplitude measurement is susceptible to noise, the calculated gamma curve can contain serious errors. Errors in the gamma curve show up in determination of the target power and the recording and erasing powers. Curve fitting is usually employed to reduce the effects of this problem, however, at the cost of program space and computation time. Higher order curve fitting yields better results, but at the cost of optical drive processing resources and time. In conventional drives, lower order curve fitting is preferred, with the risk of determining erroneous recording and erasing powers being accepted for sake of recording speed. Another method of reducing errors in the gamma curve is to use a low pass filter to smooth the measured modulation signals. Generally, curve fitting and low pass filter smoothing require additional hardware and additional costs. Hence, the conventional method for determining optimal recording and erasing powers for an optical disk drive is inefficient.

SUMMARY OF INVENTION

It is therefore a primary objective of the present invention to provide an efficient method for selecting a target power for an optical disk with an optical disk drive for determining the optimal recording and erasing powers to reduce errors originating from measured modulation signal noise, and to reduce required hardware and OPC processing time.

Briefly summarized, the present invention includes reading a target gamma value from an optical disk using an optical disk drive, performing a plurality of write tests to the optical disk at a plurality of test powers, measuring a corresponding plurality of modulation signal strength values of the optical disk for the plurality of write tests and generating a modulation signal strength versus power curve, determining a possible gamma line for a considered power within the domain of the plurality of test powers, and selecting the considered power as the target power of the optical disk drive when the possible gamma line is substantially tangential to the modulation signal strength versus power curve at the considered power. A gamma value is a ratio of a change in modulation signal to change in power normalized by a ratio of modulation signal strength to power, and the target gamma value identifies the target power of the optical disk. A possible gamma line has a slope equal to the target gamma multiplied by a ratio of the considered modulation signal strength to the considered power. According to the method, powers within the domain of the plurality of test powers are considered until a considered power is selected as the target power for the optical disk.

According to the present invention, a possible gamma line is substantially tangential to the modulation signal strength versus power curve when it has modulating strength values at two test powers bracketing the considered power that are both greater than or both less than the modulation signal strength versus power curve at the two test powers bracketing the considered power.

According to the present invention, when no possible gamma line is substantially tangential to the modulation signal strength versus power curve at each considered power, the method further includes interpolating between two possible gamma lines that are nearly substantially tangential to the modulation signal strength versus power curve to determine the target power of the optical disk drive.

It is an advantage of the present invention that selecting the considered power as the target power of the optical disk drive when the possible gamma line is substantially tangential to the modulation signal strength versus power curve at the considered power reduces errors originating from noise in the modulation signal strength versus power curve.

It is a further advantage of the present invention that determining possible gamma lines rather than differentiating the modulation signal strength versus power curve allows the method to be performed quickly and reduces processing time in the optical disk drive.

It is a further advantage of the present invention that determining possible gamma lines rather than differentiating the modulation signal strength versus power curve reduces memory required in the optical disk drive for determining the target power.

These and other objectives of the present invention will no doubt become obvious to those of ordinary skill in the art after reading the following detailed description of the preferred embodiment that is illustrated in the various figures and drawings.

DETAILED DESCRIPTION

The present invention method can be realized with hardware and programming of an optical disk drive, such as the CR-RW drive shown in FIG. 1. The present invention also applies to other writable optical disk systems such as CD-R, DVD-R, DVD-RW, DVD+RW, and HD-DVD.

Figure 3A:
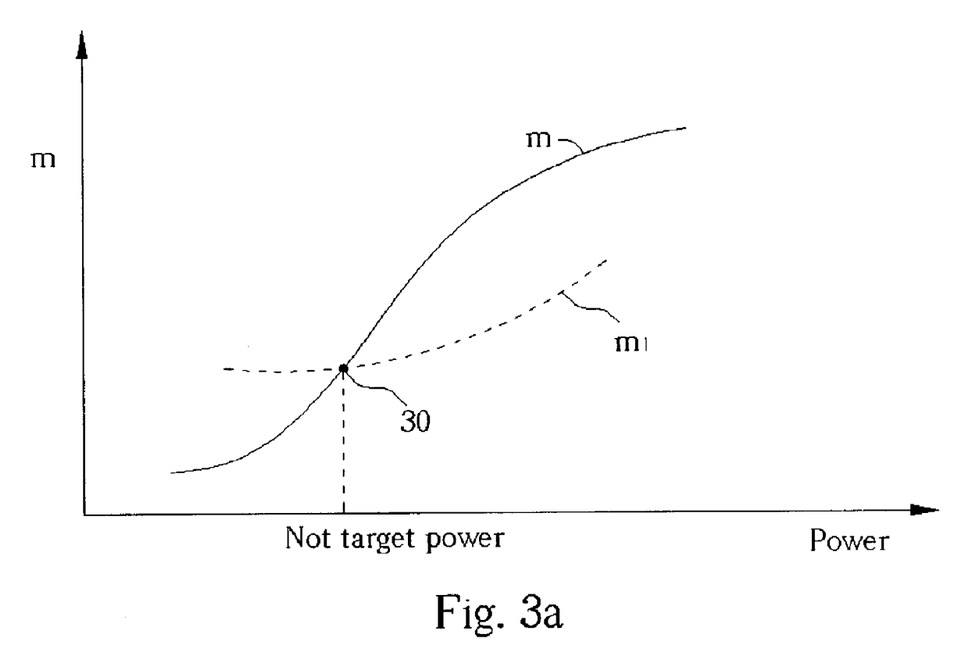
FIG. 3a and FIG. 3b are graphs of gamma curve calculations according to the present invention.

The following is a short mathematical derivation that is required to implement the present invention method. Referring to Eqn. 1, if gamma is assumed to be the target value, a pseudo-modulation amplitude curve $m_1$ can be defined as:

$$\frac{dm_1}{dP_W} = \gamma_T \left( \frac{m_1}{P_W} \right) \qquad \text{(Eqn. 3)}$$

where, $\gamma_T$ is a target gamma value read from an optical disk by the optical disk drive;

$m_1$ represents a pseudo-modulation amplitude;

$P_W$ is recording power of the optical drive; and $dm/dP_W$ is a differential of pseudo-modulation amplitude with respect to recording power;

FIG. 3a shows a modulation curve m according to Eqn. 1 and a pseudo-modulation curve $m_1$ according to Eqn. 3. The point at which the curves m and $m_1$ intersect (i.e. $m=m_1$) is designated by a numeral 30. At this point Eqn. 1 and Eqn. 3 can be combined and rearranged to form Eqn. 4 as follows:

$$\frac{dm}{dP_W} = \frac{dm_1}{dP_W} \left( \frac{\gamma}{\gamma_T} \right) \qquad \text{(Eqn. 4)}$$

Figure 3B:
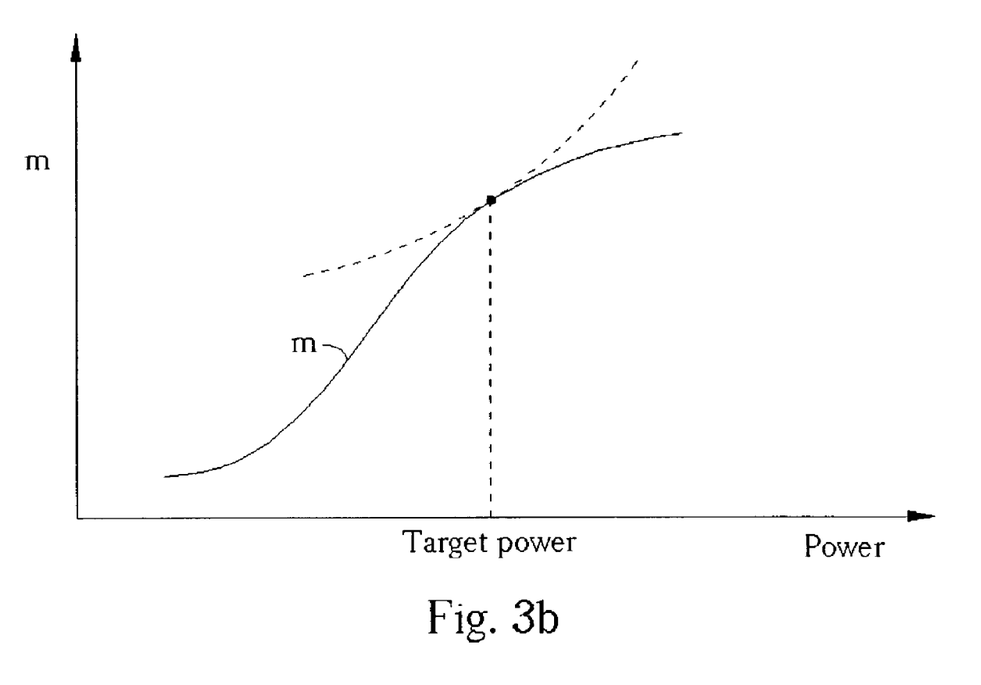

Clearly, if the gamma value of the actual measured modulation curve m at the point of intersection is equal to the target gamma, then the slopes of the modulation curves m and $m_1$ (represented by the derivatives in Eqn. 4) will also be equal. In the same way, as illustrated in FIG. 3a, when the modulation curves m and $m_1$ do not have equal slopes where they intersect, the gamma value of the actual measured modulation curve m is not equal to the target gamma and consequently the corresponding power is not the target power. FIG. 3b illustrates a case where the m and $m_1$ curves are tangential and consequently the gamma value and the target gamma are equal, the corresponding power being the target power.

Figure 4:
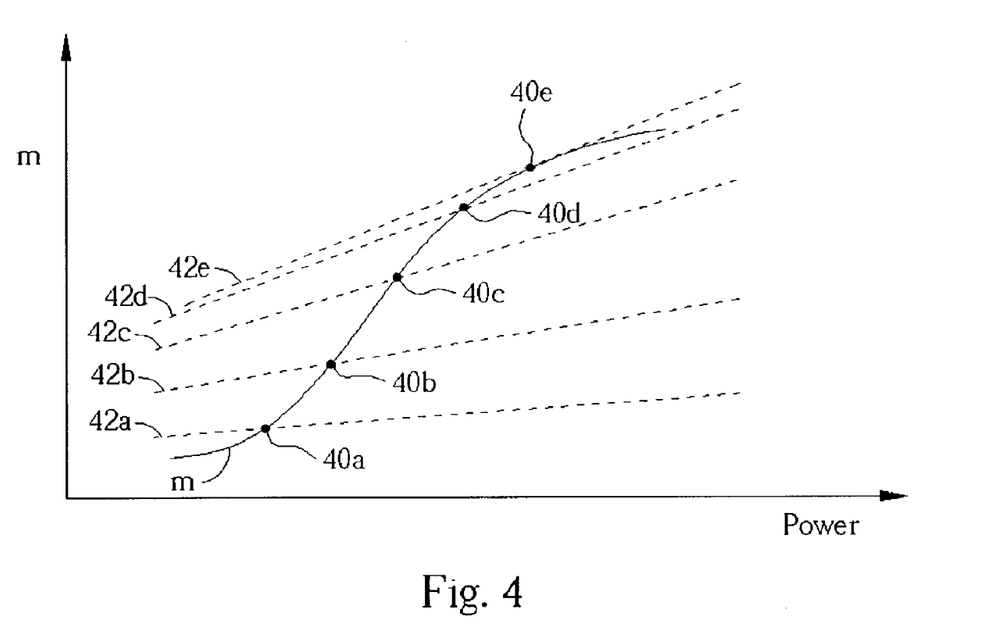
FIG. 4 is a graph of possible gamma lines according to the present invention.

Please refer to FIG. 4, showing a simplification of the relationship illustrated in Eqn. 4. At points 40a-e along the actual measured modulation curve m, lines 42a-e, termed "possible gamma lines", represent the slopes of each pseudo-modulation curve $m_1$ intersecting these points 40a-e. Thus, at a point where the slope of a line 42a-e is equal to the slope of the measured modulation curve m, the power is the target power. In the example illustrated in FIG. 4, point 40e meets this condition. The points 40a-e can be actual sample points where test recording powers were used to write to the OPC area of a CD and the corresponding modulation signals were measured, or can be interpolated or extrapolated points of the measured modulation curve m. In practical application, the modulation amplitude curves and possible gamma lines described are stored and processed by the optical disk drive as discrete data and arithmetic functions, and are described graphically for clarity.

Figure 5:
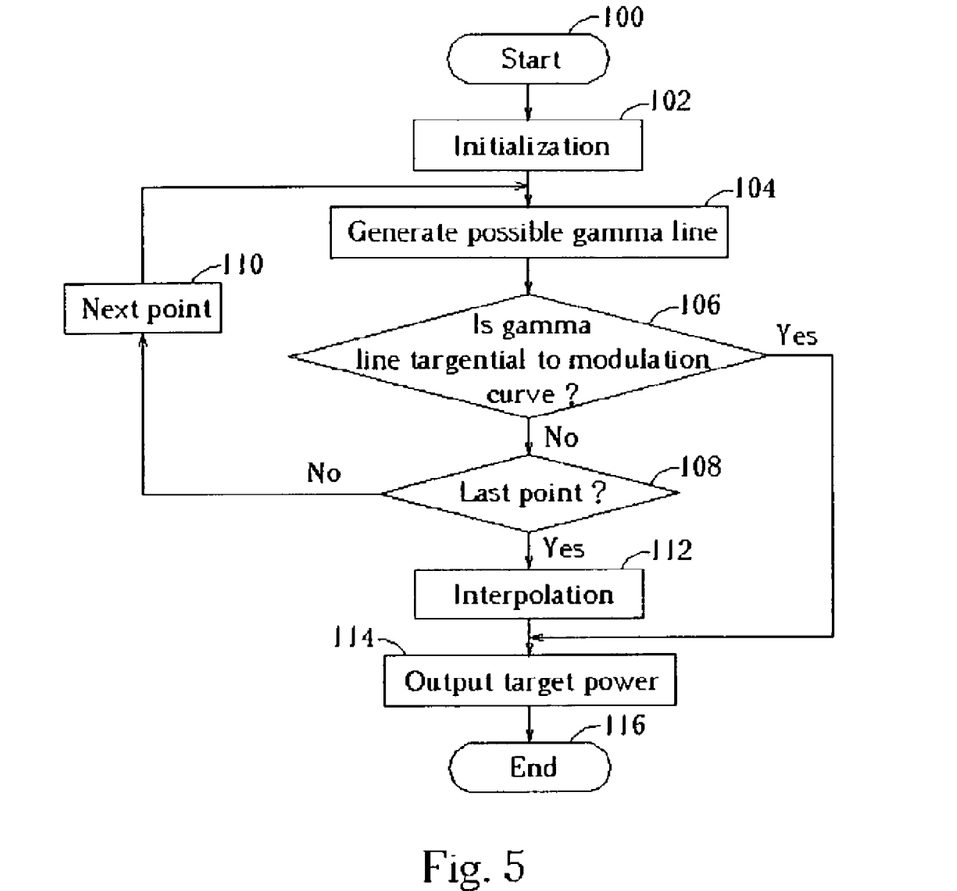
FIG. 5 is a flowchart of a method for determining a target power according to the present invention.

The present invention method for determining the target power and the corresponding optimal writing and erasing powers is realized with conventional hardware, such as microcontrollers, memory chips, and logic circuits, and associated software of the optical disk drive. The method is illustrated in a flowchart of FIG. 5 and is described in detail as follows:

Step 100: Start;

Step 102: Initialization. The optical disk drive reads the target gamma value from the optical disk, performs a predetermined number of write tests at a predetermined number of test powers, and measures the corresponding modulation amplitudes. A modulation amplitude curve similar to the curve m of FIG. 4 can be generated, and discrete numerical values and related defining functions can be stored in the memory of the optical drive. A first considered power, or point of the modulation curve, is selected;

Step 104: The optical disk drive generates a possible gamma line at the currently considered test power using the target gamma value;

Step 106: The optical disk drive performs a tangent test on the possible gamma line with respect to the modulation curve to determine if the possible gamma line is tangential within error to the modulation curve at the considered power. If the possible gamma line is tangent to the modulation curve go to step 114, otherwise, go to step 108;

Step 108: The optical disk drive determines if the last point of the modulation curve, i.e. the last considered power, has been considered. If the last considered power has been processed go to step 112, if not, go to step 110;

Step 110: The optical disk drive selects a next power, and corresponding point on the modulation curve, for consideration;

Step 112: No possible gamma line meets the tangent criteria of step 106. The optical disk drive selects at least two possible gamma lines that nearly met the criteria and interpolates between them to determine an interpolated considered power;

Step 114: The considered power is selected as the target power and output;

Step 116: End.

In the method described above, a predetermined number of write tests at a predetermined number of test powers should be selected in sufficient quantity to accurately perform the tangent test. The predetermined number of test powers can also be all the test powers in a specific domain. If the predetermined number of test powers is less than all the test powers in a specific domain, the optical disk drive must perform additional writing tests and reading of modulation amplitudes as necessary. Specifically, the present invention method can be performed after all the modulation amplitudes have been measured or during the testing/measuring process. Furthermore, the considered powers can be, however need not be, the actual test powers. Of course, it may be convenient to consider only the test powers if the method is applied as the writing tests and modulation signal measurements are performed. On the contrary, if all writing tests and modulation amplitude measurements are performed ahead of time, it may be timesaving to select considered powers independent of the actual test powers. In addition, low pass filtering or curve fitting can be performed on the modulation signal to remove noise before or after modulation signal strength values are measured, thereby smoothing the modulation amplitude curve and improving the overall effectiveness of the present invention.

Figure 6:
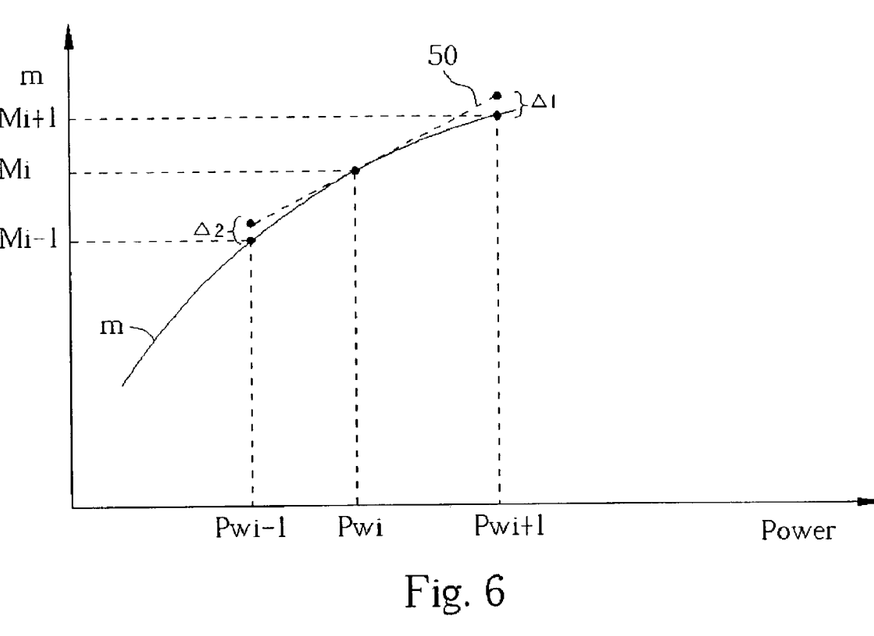
FIG. 6 is a graph of a numerical method for performing a tangent test according to the present invention

Referencing FIG. 6, determining if a possible gamma line 50 is tangent to the modulation curve can be performed by the following numerical method:

$$S_i = \gamma_T\left(\frac{m_i}{P_{Wi}}\right)$$ (Eqns. 5)

$$\Delta_1 = m_i + S_i(P_{Wi+1} - P_{Wi}) - m_{i+1}$$

$$\Delta_2 = m_i - S_i(P_{Wi} - P_{Wi-1}) - m_{i-1}$$

where, $S_i$ is a slope of a possible gamma line;

i is an index of the considered power and corresponding considered possible gamma line, and i+1 and i−1 are indexes of powers that bracket the considered power and are normally the adjacent powers;

$\Delta_1$ and $\Delta_2$ are differences between the possible gamma line and the modulation curve at points bracketing to the power under consideration;

According to the present invention, if $\Delta_1$ and $\Delta_2$ are both greater than zero or both less than zero, the possible gamma line under consideration is tangent to the modulation curve and the considered power $P_{Wi}$ is the target power. At least three points, that is, three considered powers, are required to implement Eqns. 5. Naturally, another numerical method could be used to test whether each possible gamma line is tangent to the modulation curve, however, the aim of the procedure described in FIG. 6 and Eqns. 5 is to reduce memory requirements and processing time while increasing accuracy.

When no possible gamma line is found to be tangent to the modulation curve, the optical disk drive performs interpolation between at least two possible gamma lines that are close to being tangent to the modulation curve. The interpolation can be linear or higher order, taking into consideration program space requirements and processing speed. The target power is then selected based on the result of the interpolation.

After the target power is determined by directly selecting a suitable considered power or by interpolation using the method as described above, the optical drive executes Eqns. 2 to determine the optimal recording and erasing powers for the optical disk drive and the optical disk to be written or erased.

In contrast to the prior art, the present invention compares possible gamma lines with a measured modulation amplitude curve to determine a target power and corresponding optimal recording and erasing powers. The present invention method results in less error in the optimal recording and erasing powers, as noise from modulation measurements is inherently compensated for rather than being amplified as in the prior art. The present invention method requires less program space and memory, can be processed faster than conventional methods, and accordingly has a less costly implementation. More specifically, complicated hardware and algorithms for performing numerical differentiations are not required. Furthermore, the present invention method does not require complicated curve fitting or low pass filtering as is required in the prior art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for selecting a target power for writing to an optical disk with an optical disk drive, the method comprising:
   reading a target gamma value from the optical disk using the optical disk drive, wherein a gamma value is a ratio of a change in modulation signal to change in power normalized by a ratio of modulation signal strength to power, and the target gamma value identifies the target power of the optical disk;
   performing a plurality of write tests to the optical disk at a plurality of test powers using the optical disk drive;
   measuring a corresponding plurality of modulation signal strength values of the optical disk for the plurality of write tests using the optical disk drive, and generating a modulation signal strength versus power curve;
   determining a possible gamma line for a considered power within the domain of the plurality of test powers, wherein the possible gamma line has a slope equal to the target gamma multiplied by a ratio of the considered modulation signal strength to the considered power; and
   selecting the considered power as the target power of the optical disk drive when the possible gamma line is substantially tangential to the modulation signal strength versus power curve at the considered power;
   wherein powers within the domain of the plurality of test powers are considered until a considered power is selected as the target power for the optical disk.

2. The method of claim 1 wherein a possible gamma line is substantially tangential to the modulation signal strength versus power curve when it has modulating strength values at two test powers bracketing the considered power that are both greater than or both less than the modulation signal strength versus power curve at the two test powers bracketing the considered power.

3. The method of claim 1 further comprising when no possible gamma line is substantially tangential to the modulation signal strength versus power curve at each considered power, interpolating between at least two possible gamma lines that are nearly substantially tangential to the modulation signal strength versus power curve to determine the target power of the optical disk drive.

4. The method of claim 1 wherein the considered powers are the test powers.

5. The method of claim 4 wherein performing the plurality of write tests and measuring the plurality of modulation signal strength values are performed for at least three test powers before considering each considered power.

6. The method of claim 1 wherein performing the plurality of write tests and measuring the plurality of modulation signal strength values are performed for all test powers prior to considering each considered power.

7. The method of claim 1 further comprising setting a recording power of the optical disk drive based on the target power.

8. The method of claim 1 further comprising setting an erasing power of the optical disk drive based on the target power.

9. The method of claim 1 further comprising low pass filtering or curve fitting the modulation signal before measuring modulation signal strength values.

10. The method of claim 1 further comprising low pass filtering or curve fitting the modulation signal after measuring modulation signal strength values.

11. The method of claim 1 wherein the optical disk drive is a recordable or rewritable CD, DVD, or HD-DVD drive.

12. An optical disk drive comprising a microcontroller, a memory, and related circuitry for performing the method of claim 1.

13. A method for selecting a target power for writing to an optical disk with an optical disk drive, the method comprising:
   reading a target gamma value from the optical disk using the optical disk drive, wherein a gamma value is a ratio of a change in modulation signal to change in power normalized by a ratio of modulation signal strength to power, and the target gamma value identifies the target power of the optical disk;
   performing a plurality of write tests to the optical disk at a plurality of test powers using the optical disk drive;
   measuring a corresponding plurality of modulation signal strength values of the optical disk for the plurality of write tests using the optical disk drive, and generating a modulation signal strength versus power curve;
   successively generating possible gamma lines for considered powers within the domain of the plurality of test powers, wherein each possible gamma line has a slope equal to the target gamma multiplied by a ratio of the considered modulation signal strength to each considered power; and selecting a considered power as the target power of the optical disk drive and ceasing possible gamma line generation, when the corresponding possible gamma line is substantially tangential to the modulation signal strength versus power curve at the considered power; and
   interpolating between at least two possible gamma lines that are nearly substantially tangential to the modulation signal strength versus power curve to determine the target power of the optical disk drive when no single possible gamma line is substantially tangential to the modulation signal strength versus power curve.

14. The method of claim 13 wherein a possible gamma line is substantially tangential to the modulation signal strength versus power curve when it has modulating strength values at two test powers bracketing the considered power that are both greater than or both less than the modulation signal strength versus power curve at the two test powers bracketing the considered power.

15. The method of claim 13 wherein the considered powers are the test powers.

16. The method of claim 15 wherein performing the plurality of write tests and measuring the plurality of modulation signal strength values are performed for at least three test powers before considering each considered power.

17. The method of claim 13 wherein performing the plurality of write tests and measuring the plurality of modulation signal strength values are performed for all test powers prior to considering each considered power.

18. The method of claim 13 further comprising setting a recording power of the optical disk drive based on the target power.

19. The method of claim 13 further comprising setting an erasing power of the optical disk drive based on the target power.

20. The method of claim 13 further comprising low pass filtering or curve fitting the modulation signal before measuring modulation signal strength values.

21. The method of claim 13 further comprising low pass filtering or curve fitting the modulation signal after measuring modulation signal strength values.

22. The method of claim 13 wherein the optical disk drive is a recordable or rewritable CD, DVD, or HD-DVD drive.

23. An optical disk drive comprising a microcontroller, a memory, and related circuitry for performing the method of claim 13.

* * * * *